May 3, 1966  J. C. PACK  3,249,000
PHOTOGRAPHIC REPRODUCTION CONTROL APPARATUS
Filed Feb. 27, 1963  3 Sheets-Sheet 1

INVENTOR.
JEAN C. PACK,
BY

ATTORNEY

May 3, 1966 J. C. PACK 3,249,000
PHOTOGRAPHIC REPRODUCTION CONTROL APPARATUS
Filed Feb. 27, 1963 3 Sheets-Sheet 2
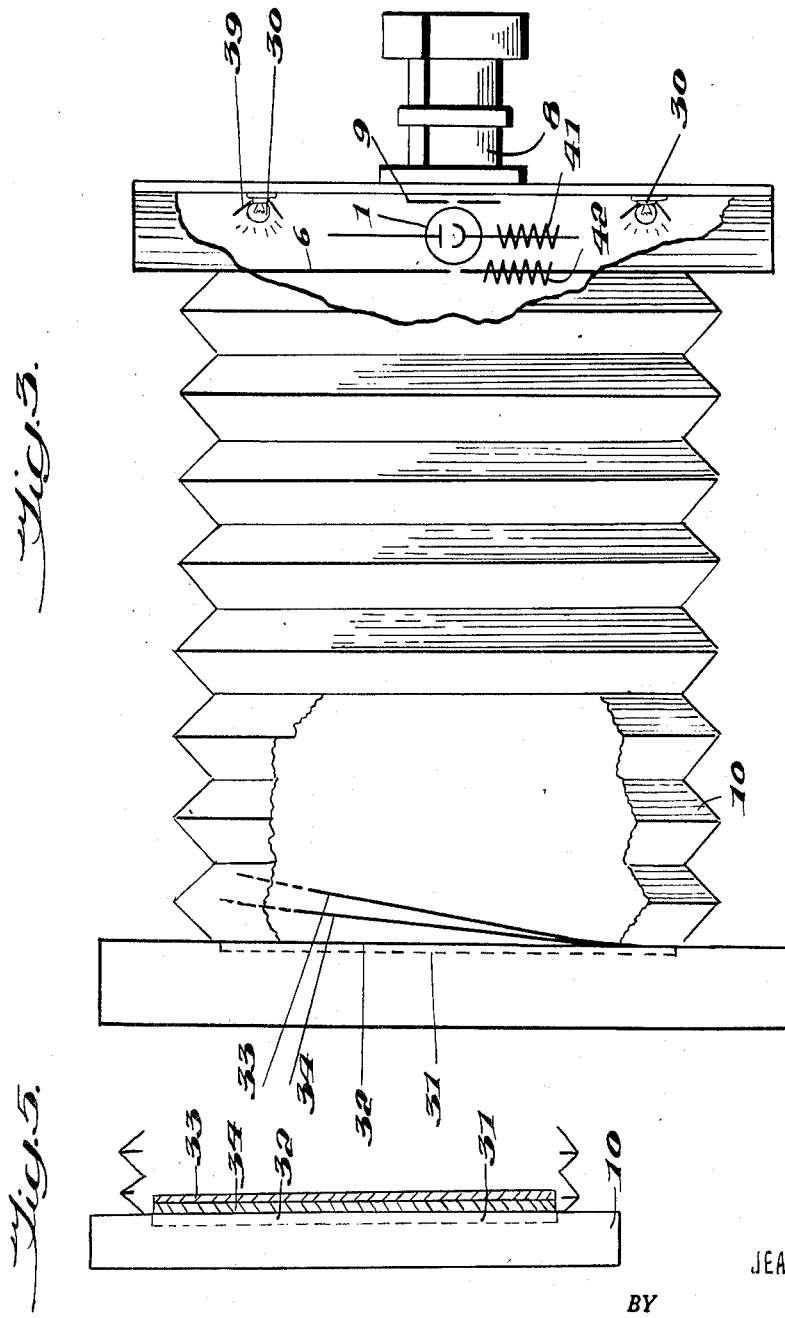
INVENTOR.
JEAN C. PACK
BY May 3, 1966  J. C. PACK  3,249,000
PHOTOGRAPHIC REPRODUCTION CONTROL APPARATUS
Filed Feb. 27, 1963  3 Sheets-Sheet 3
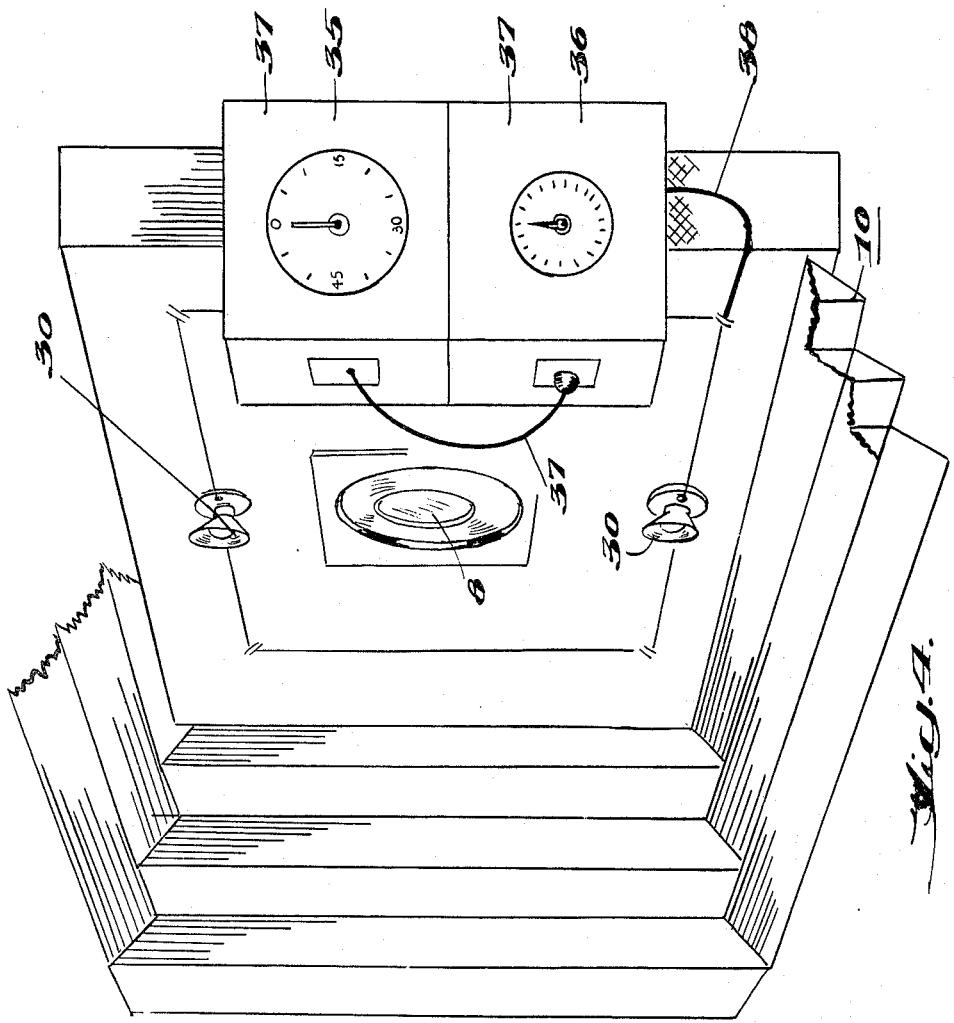
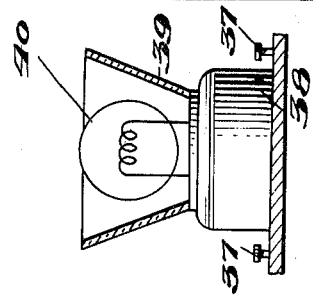
INVENTOR.
JEAN C. PACK
BY
ATTORNEY 3,249,000
PHOTOGRAPHIC REPRODUCTION CONTROL
APPARATUS
Jean C. Pack, 6000 Crawford Drive, Rockville, Md.
Filed Feb. 27, 1963, Ser. No. 261,370
5 Claims. (Cl. 88—24)

This invention relates to improvements in photographic reproduction technique and more particularly to novel method and apparatus in the art of halftone reproductions and the like.

The present day process of producing commercial halftone prints for the industry requires considerable time in minutes depending upon the process employed or the method of operating the present day equipment as well understood in the art. The improvements according to the present invention are equally applicable to the production of halftones both in color or black and white negatives or positives with equal facility and according to whichever reproduction is desired at the time.

One important object of the present invention is to provide a novel method of photographing a halftone in color or black and white of any desired contrast to produce the desired quality of halftone for use in photo engraving, photo offset and photogravure as the occasion may demand or require for a particular result.

Another object of the invention is to produce the halftone in the camera by a novel arrangement of integrated flashing light apparatus associated therewith and operated simultaneously in time period relation with camera shutter with which it may be associated.

A further object of the invention is to provide a novel flashlights arrangement on the interior of the camera and timing apparatus associated with the lens and shutter of the camera to effect the desired minimum time to produce the desired halftone result in a matter of seconds.

A further object of the invention is to provide a contact screen arrangement at the rear of the camera interior to be more effective in cooperation with the integrated time flash light at the front interior of the camera.

A still further object of the invention is to provide a simple and reliable method for positively operating a halftone flash apparatus which shall be simple in construction and integrated with the camera operation to reduce to a minimum the time and expense of producing such halftone reproductions by eliminating the human error now present in such exposures.

A further object of the invention is to provide a simplified electrical circuit to integrate the operation of the camera shutter and flashlight as to integrate the detail highlight and the shadow flashlight exposure into one continuous exposure as to reduce to a minimum the time required to produce a halftone negative or positive in black and white or color and continuous tone color separation negative.

A further object of the invention is to provide a novel method of reproducing halftone reproduction by a contact screen selecting the lumen power of the light flash source, the shutter opening and simultaneously integrating the time period to produce the desired quality of halftones in black and white or color separation.

A further object of the invention is to provide a novel halftone apparatus which includes an electronic timing circuit which is adapted to measure, store, memorize, and transmit the light intensity passing through a camera lens to automatically time the operation of a camera shutter after all variables have been measured.

A still further object of the invention is to provide a halftone electronically operated apparatus of the character designated including a light measuring section, a memory section and a timing section all integrated to automatically produce the desired quality of halftone in a minimum of time and eliminating the human error heretofore present in such apparatus.

These and other objects of the invention will be more manifest from the following specification and drawings and more specifically set forth in the claims.

In the drawings:

FIG. 3 is a view in elevation and partially in section of a camera showing the relative position of the negative at the rear of the camera container and the flash lights at the front interior of the camera;

FIG. 4 is a composite view partially in section showing the flash lights in the camera and the timer and rheostat light controls for shadow density to be reproduced on the negative.

FIG. 5 is a sectional view in elevation of the negative and screen contacts located in the rear wall of the camera; and FIG. 6 is an enlarged perspective view of the lens and shutter adjustments for calibration of the exposure adjustments.

Figure 1:
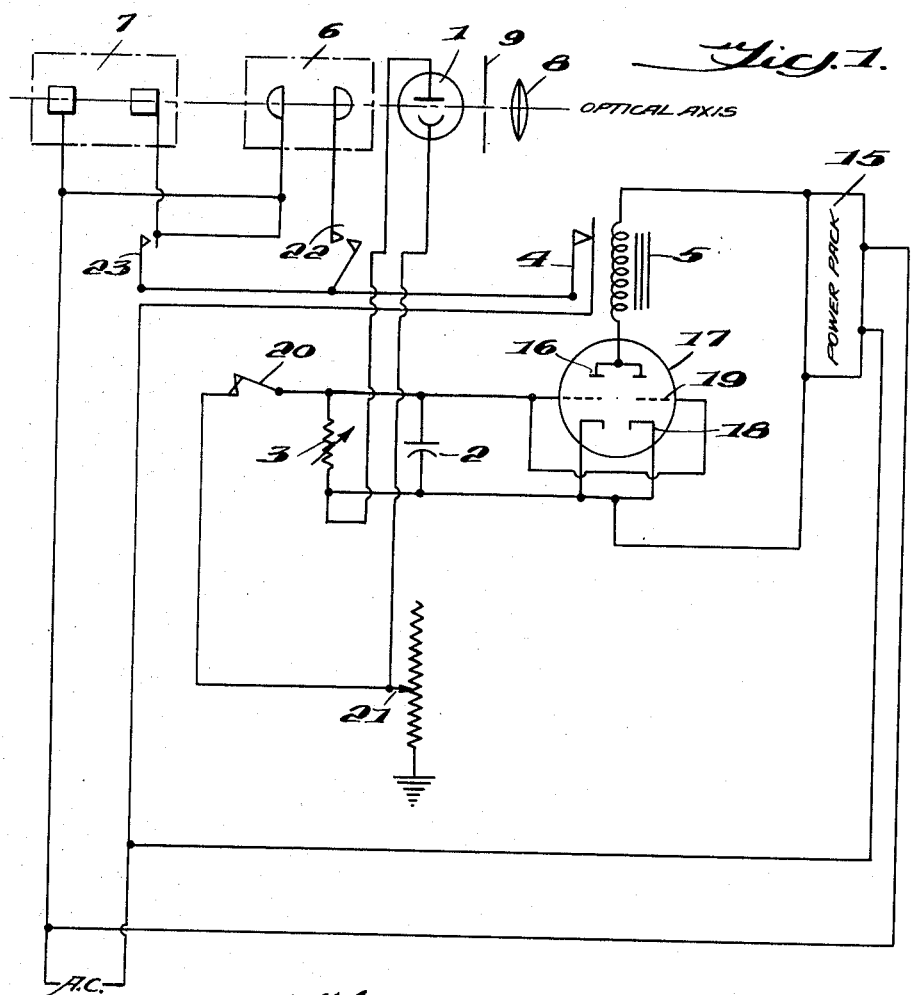
FIG. 1 is a schematic electrical circuit diagram of the electrical components operatively connected to portions of the optical and camera components of one form of apparatus for carrying out the novel features of the invention.
Figure 2:
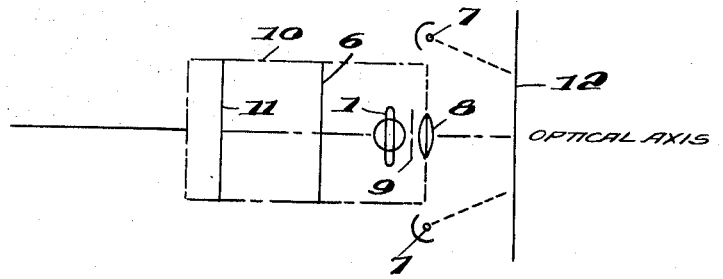
FIG. 2 is a physical schematic view showing the relation of camera parts.

Referring to FIGS. 1 and 2 of the drawing there is shown a schematic layout of the camera apparatus and the electric circuit components associated therewith constructed and arranged in accordance with the present invention.

The novel apparatus consists basically of three electronically connected parts or sections, a light intensity measuring section indicated generally by a photo cell 1 mounted for movement in and out of the optical axes of the camera; a light intensity memory section indicated by a capacitor 2; and including a variable resistor 3 the photo cell 1 and the capacitor 2 and a timing section also including variable resistor 3 and the photo cell 1. More specifically included in the layout is a relay switch part 4–5 that controls electrically operated camera shutter 6, electric lights 7—7 and photoelectric cell 1, the movement of which takes place between the shutter 6, and the back of the camera lens 8 as hereinafter more fully described.

Stated generally the arrangement is such that the intensity of light passing through the camera lens 8 and the photo cell 1 is measured and memorized or stored by the capacitor 2. Of course the resolving power of the lens, as well as the reflection or transmission quality of the copy being reproduced when light intensity is measured at the back of the lens are also taken into consideration. Once the operator has determined the proper setting for the density, contrast and quality range he desires for the negatives or positives, either halftones or continuous tone, color or black and white, the instrument is designed to compensate for all variations in light intensity and completely control exposure timing at any selected operative shutter opening.

The physical schematic layout showing FIG. 2 illustrates a camera box 10 indicated in dotted lines and includes lens 8, the swingably mounted photo cell 1, shutter 6, aperture diaphragm 9 and a negative 11 to be exposed at the desired quality. Positioned out in front of the camera lens 8 is an object 12 whose light reflective intensity is to be reproduced on the negative 11 by means of electric lamps 7—7 connected into the novel electrical timing circuit as hereinafter more fully described.

The electrical circuit system for operating the several parts in timed relation is powered by a source of A.C. current connected to a conventional type of power pack indicated by the numeral 15. Connected to the power pack is a solenoid relay 5 and its associated switch contacts 4. This circuit is also connected to plates 16—16 of a twin diode control tube 17 of conventional type. The filaments 18—18 of the tube are connected to one side of the capacitor 2 and the grid elements 19—19 are connected to the opposite side of said capacitor. Also connected in parallel with the capacitor is the variable resistor 3 and this circuit is controlled by a manual switch 20 and a variable resistor 21 which is manually operated to control or compensate for the various film requirements.

The photo cell is connected in circuit with the capacitor 2, the variable resistances 3, and 21 and the switch 20 to control the time of opening and closing of the shutter mechanism 6, and flash lamps 7—7. Further connections for controlling the timing of the shutter 6 is a manual switch 22 and an associated switch 23 connected in circuit therewith to control the lamps 7—7 as shown in FIG. 2.

Having thus described the above electrical circuit and its connected parts for accomplishing the desired result of integrating light intensity measurements and timing requirements for producing uniform quality of halftones, the operation is as follows;

The camera shutter 6, is closed by the switch 22 at the start of the exposure period, and thus the light from lamp 7—7 is reflected from the copy object 12 and the lens 8 and absorbed by the photo cell 1 and thus charge the photo cell. The resistance of the cell varies inversely with light intensity and as the light increases, the resistance of the cell decreases and the voltage across the capacitor 2 decreases accordingly when switch 22 is closed. When switch 22 is closed, a voltage is recorded in the capacitor 2 which is dependent upon the resistance of the photo cell 1 and the manually variable resistance 21 connected thereto. When switch 20 is opened, the shutter 6 (solenoid operated, not shown) is opened and the cell 1 begins to discharge through the variable resistance 3 and when this voltage has discharged to a specific valve, the plate current relay 5 opens the switch 4 and causes the shutter 6, to close, when the above procedure is carried out for a particular film or halftone requirement with all parts adjusted or calibrated, all reproductions will be exactly the same and thus eliminate any human error in timing as used in present day apparatus.

Referring to the physical layout of a conventional camera apparatus shown in FIG. 3 wherein the camera lens box 8, the adjustable opening aperture diaphragm 9 and shutter 6 are located in the front of the camera wall. These camera parts are of the usual and well known type and operate and are adjustable to cooperate with a particular lens stop such as $f/11$, $f/16$, and $f/22$, etc. as well known in the art. Associated with these parts is the novel arrangement of the adjustable phototube 1, with its electric circuit lead wires and a solenoid operator to move the same into and out of the optical axis as required during the timing exposure of a negative 32 indicated at the rear of the camera. It will be noted that the phototube 1 is located between the shutter 6 and the lens 8 for the purpose of properly calibrating the parts to control the transmission of light through the camera to produce the desired result. Also located at the front of the camera and properly spaced from the optical axis are flashlights 30—30.

At the rear of the camera 10 is located a removable closure frame 31 and this frame is designed to hold or retain in place a negative 31 and associates contact screens 33 and 34 to produce the desired light effects on the negative.

In FIG. 4, there is shown a timer control box indicated by numeral 35 and a rheostat control box 36 which are connected together in electric circuit by connections 37—37 on opposite sides thereof and these control members are likewise connected with flashlights 30—30 in the camera by a lead 38 all of which are electrically connected with the electric power source and controlled electronically. While I have shown two flashlights at the front of the camera any number may be used to produce the desired light effect. The flashlights 30 are provided with appropriate filter shield 39 as well as the light bulb 40 itself being of a filter type as indicated in FIGURE 6.

More particularly the potentiometer or control rheostat for the circuits is located conveniently in control box 36 while the timer mechanism is located in box 35 and these instrumentalities are conveniently located at the front of the camera near the shutter and diaphragm devices to facilitate the unit operation thereof.

The phototube 1 is moved into and out of the camera optical axis at the proper time by a solenoid indicated by the numeral 41 and these parts of the electrical circuit are connected in the circuit shown in FIGS. 1 and 2. For purposes of illustration the shutter 6 is likewise operated by a solenoid 42 connected in the electrical circuit shown in FIGS. 1 and 2.

Having thus described the novel arrangement for producing and reproducing halftones and the like in a more efficient manner, the parts shown are for illustration only and may be changed or substituted without departing from the invention as defined in the appended claims.

What is claimed is:

1. Apparatus for producing halftone positives or negatives including a camera having front and rear walls, a contact screen mounted in the rear wall, a lens mounted in the front wall, an adjustable shutter mounted in the front wall spaced rearwardly of said lens, a movable photo-electric tube interposed between said lens and said shutter, a flashlight mounted in the inside the front wall of the camera to direct light toward the rear wall of said camera and said contact screen, said photo-electric tube measuring the quantity of reflected light, and timing the operation of the shutter, and timing the period of light from said flashlight to produce the desired halftone reproduction.

2. Apparatus of the character described in claim 1 including an object to be reproduced, means for illuminating the object, means for storing the reflected quantity of light measured, means for automatically timing the period of illumination and the flashlight means for reproducing a halftone negative.

3. Apparatus of the character described in claim 1 including filter shields on the flashlight to integrate the desired quantity of the detail highlight and the shadow flashlight exposure are summed electronically to produce one continuous exposure.

4. Apparatus of the character described in claim 1 including an object to be copied, means to move the phototube out of the optical axis when said shutter is open so as to time the action of the shutter on admitting reflected light and the flashlight simultaneously so as to integrate the source and produce a standard halftone of the desired quality.

5. For use in a halftone reproduction camera apparatus, an electronically controlled timing system for integrating reflected light from an objective to be copied and the shadow light in a continuous exposure, comprising a source of light reflected from said copy, a lens, a shutter, a photo-tube located between said lens and said shutter and movable into and out of the optical axis of said camera lens and said shutter, a capacitor connected in an electrical circuit with said photo-tube and said shutter, and switch means for controlling the voltage charging of said photo-tube and switch means initiating the operation of said timing system and other switch means connected in circuit for controlling the discharge of said tube and the operation of said lighting means in timed relation to the movement of said photo-tube and the opening and closing movements of said shutter to produce a continuous halftone exposure.

References Cited by the Examiner

UNITED STATES PATENTS 2,593,216  4/1952  Sussin _____ 88—24
2,621,569  12/1952  Glassey _____ 96—45 X NORTON ANSHER, *Primary Examiner.*

R. A. WINTERCORN, *Assistant Examiner.*